United States Patent
Cho et al.

(10) Patent No.: US 10,099,693 B2
(45) Date of Patent: Oct. 16, 2018

(54) CONTROL METHOD OF DUAL CLUTCH TRANSMISSION FOR HYBRID ELECTRIC VEHICLE AND CONTROL SYSTEM FOR THE SAME

(71) Applicant: Hyundai Motor Company, Seoul (KR)

(72) Inventors: Sung Hyun Cho, Yongin-si (KR); Ju Hyun Nam, Bucheon-si (KR); Young Jun Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 477 days.

(21) Appl. No.: 15/062,918

(22) Filed: Mar. 7, 2016

(65) Prior Publication Data

US 2017/0101101 A1 Apr. 13, 2017

(30) Foreign Application Priority Data

Oct. 8, 2015 (KR) .......................... 10-2015-0141302

(51) Int. Cl.
*B60W 20/30* (2016.01)
*B60W 30/18* (2012.01)
(Continued)

(52) U.S. Cl.
CPC ....... *B60W 30/18127* (2013.01); *B60K 6/387* (2013.01); *B60K 6/547* (2013.01); *B60W 10/02* (2013.01); *B60W 10/06* (2013.01); *B60W 10/08* (2013.01); *B60W 10/113* (2013.01); *B60W 20/14* (2016.01); *B60W 20/30* (2013.01);
(Continued)

(58) Field of Classification Search
CPC ...... B60W 20/30; B60W 10/08; B60W 10/02; B60W 10/113; B60W 10/06; B60W 30/19; B60W 30/18127
See application file for complete search history.

(56) References Cited

U.S. PATENT DOCUMENTS 8,287,429 B2 * 10/2012 Kumazaki .............. B60K 6/445
477/115
8,868,271 B2 * 10/2014 Kim ..................... B60W 10/113
701/22
(Continued)

FOREIGN PATENT DOCUMENTS

JP 2004-204960 7/2004
JP 2005-176541 6/2005
(Continued)

*Primary Examiner* — Erin D Bishop
(74) *Attorney, Agent, or Firm* — Brinks Gilson & Lione (57) ABSTRACT

A control method of a dual clutch transmission for a hybrid electric vehicle, and a control system for the dual clutch transmission. The control method includes: a handover step of performing a handover process of a transmission while controlling clutch torque of an engaging-side input shaft to maintain a rotational speed change rate of the engaging-side input shaft at a reference change rate; and an actual shifting step of synchronizing a rotational speed of a motor with a rotational speed of the engaging-side input shaft when the first finish determining step determines that the handover process has finished, and of increasing a rotational speed change rate of the motor by increasing motor torque when a synchronization rate is a reference synchronization rate or less.

12 Claims, 3 Drawing Sheets

(51) Int. Cl.
  *B60K 6/387* (2007.10)
  *B60W 10/02* (2006.01)
  *B60W 10/08* (2006.01)
  *B60K 6/547* (2007.10)
  *B60W 10/06* (2006.01)
  *B60W 10/113* (2012.01)
  *B60W 30/19* (2012.01)
  *B60W 20/14* (2016.01)
  *B60K 6/48* (2007.10)

(52) U.S. Cl.
  CPC ..... *B60W 30/19* (2013.01); *B60K 2006/4825* (2013.01); *B60W 2510/0208* (2013.01); *B60W 2510/0241* (2013.01); *B60W 2510/1005* (2013.01); *B60W 2710/027* (2013.01); *B60W 2710/028* (2013.01); *B60W 2710/081* (2013.01); *B60W 2710/082* (2013.01); *B60W 2710/083* (2013.01); *B60W 2710/1005* (2013.01); *B60Y 2200/92* (2013.01); *B60Y 2300/18125* (2013.01); *B60Y 2300/42* (2013.01); *B60Y 2300/60* (2013.01); *B60Y 2300/70* (2013.01); *Y02T 10/6252* (2013.01); *Y02T 10/6286* (2013.01); *Y10S 903/914* (2013.01); *Y10S 903/93* (2013.01)

(56) References Cited

U.S. PATENT DOCUMENTS 8,882,632 B2 * 11/2014 Kumazaki ................ B60K 6/48
  477/3
2013/0296100 A1   11/2013 Nefcy et al.

FOREIGN PATENT DOCUMENTS

| JP | 2010-265951 | 11/2010 |
| JP | 2011-190893 | 9/2011 |
| JP | 2012-86810 | 5/2012 |
| JP | 5240361 | 4/2013 |
| JP | 2014-162360 | 9/2014 |
| KR | 10-2009-0058047 | 6/2009 |
| KR | 10-2012-0082605 | 7/2012 |
| KR | 10-1481292 | 1/2015 |
| KR | 10-2015-0071119 | 6/2015 |
| WO | 2010/137123 A1 | 12/2010 |

* cited by examiner

CONTROL METHOD OF DUAL CLUTCH TRANSMISSION FOR HYBRID ELECTRIC VEHICLE AND CONTROL SYSTEM FOR THE SAME

CROSS REFERENCE TO RELATED APPLICATION

The present application claims priority to and the benefit of Korean Patent Application No. 10-2015-0141302, filed Oct. 8, 2015, which is incorporated herein by reference in its entirety.

FIELD

The present disclosure relates to a control method of a dual clutch transmission for a hybrid electric vehicle and a control system for the dual clutch transmission.

BACKGROUND

The statements in this section merely provide background information related to the present disclosure and may not constitute prior art.

Recently, eco-friendly vehicles have been rapidly developed in response to concern about environment, and an electric vehicle and a hybrid vehicle are the eco friendly vehicles.

In particular, a hybrid vehicle means a vehicle equipped with a battery and a motor for a driving mode using electric energy and an internal combustion engine for a driving mode like a common vehicle.

When a battery is used to drive a vehicle, such as in a hybrid vehicle, various plans for improving efficiency of electric energy consumption have been proposed. One form is regenerative braking that charges a battery with electric energy produced by transmitting a braking force for deceleration to a motor has drawn attention.

In power-off down-shift in regenerative braking in a hybrid vehicle, braking force by shifting and shifting response varies in accordance with brake pedal effort. To improve drivability, maintaining linearity of the braking force and shifting response is suggested.

Further, when power-off down-shift is started in a vehicle during regenerative braking, the high-efficiency period of a motor for the regenerative braking may not be continued, and the regenerative braking efficiency may decrease.

SUMMARY

The present disclosure proposes a control method of a dual clutch transmission for a hybrid electric vehicle that improves linearity of braking and shifting ability, in addition to improving fuel efficiency by increasing a high-efficiency period of a motor by effectively reducing a shifting time during regenerative braking, and a control system for the dual clutch transmission.

According to one aspect of the present disclosure, there is provided a control method of a dual clutch transmission for a hybrid electric vehicle that includes: a shifting start determining step of determining, by a transmission controller, whether a vehicle has entered power-off down-shift during regenerative braking; a handover step of performing, by the transmission controller, a handover process of a transmission while controlling clutch torque of an engaging-side input shaft to maintain a rotational speed change rate of the engaging-side input shaft at a reference change rate, when the shifting start determining step determines that the vehicle has entered the power-off down-shift; a first finish determining step of determining, by the transmission controller, whether the handover process has finished; and an actual shifting step of synchronizing, by a motor controller, a rotational speed of a motor with a rotational speed of the engaging-side input shaft when the first finish determining step determines that the handover process has finished, and of increasing, by the motor controller, a rotational speed change rate of the motor by increasing motor torque when a synchronization rate is a reference synchronization rate or less.

The larger the slip amount at the point of start time of synchronization in the actual shifting step, the larger the increase ratio of the motor torque under the reference synchronization rate may be.

When the synchronization rate is the reference synchronization rate or more in the actual shifting step, the motor torque may reduce and return to motor torque before the actual shifting step, as the synchronization progresses.

The motor torque may be continuously calculated on the basis of a predetermined slip change rate model to satisfy the rotational speed change rate of the motor that is continuously required with progress of the synchronization in the actual shifting step.

The slip change model may be determined in accordance with the slip amount at the point of start time of synchronization in the actual shifting step.

Feedback correction may be performed on the motor torque such that an actual slip change rate is equal to the slip change rate model by applying motor torque calculated by the slip change rate model in the actual shifting step.

Clutch torque of the engaging-side input shaft may be controlled such that the rotational speed change rage of the engaging-side input shaft is maintained at a predetermined level in the actual shifting step.

The method may further include a second finish determining step of checking whether the actual shifting step has finished by checking whether a current slip amount is smaller than a reference slip amount after the actual shifting step.

The method may further include a regenerative torque correcting step of correcting regenerative torque of the motor to desired regenerative torque after shifting is finished, when the second finish determining step determines that the current slip amount is smaller than the reference slip amount.

Clutch torque of the engaging-side input shaft may be corrected with the sum of remaining torque and motor torque changed by correcting regenerative torque in the regenerative torque correcting step.

Feedback correction may be performed on the clutch torque such that a slip amount generated when the corrected clutch torque does not exceed an allowable level in the regenerative torque correcting step.

A transmission controller may determine that the vehicle has entered down-shift, perform the handover process of the transmission while controlling the clutch torque of the engaging-side input shaft such that the rotational speed change rate of the engaging-side input shaft is maintained at the reference change rate, and determine whether the handover process has finished.

A motor controller may control the motor such that the rotational speed of the motor is synchronized with the rotational speed of the engaging-side input shaft in cooperation with the transmission controller, and increase the rotational speed change rate of the motor by increasing motor torque when the synchronization rate is the reference synchronization rate or less.

According to another aspect of the present disclosure, there is provided a control system for a dual clutch transmission for a hybrid electric vehicle that includes: a motor being a power source for a vehicle; a transmission including an engaging-side input shaft and a disengaging-side input shaft that each have a clutch; a transmission controller determining whether the vehicle has entered down-shift and performing a handover process of a transmission while controlling clutch torque of the engaging-side input shaft such that a rotational speed change rate of the engaging-side input shaft is maintained at a reference change rate; and a motor controller controlling the motor such that a rotational speed of the motor is synchronized with a rotational speed of the engaging-side input shaft in cooperation with the transmission controller, and increases a rotational speed change rate of the motor by increasing motor torque when a synchronization rate is a reference synchronization rate or less.

According to the control method and system for a transmission of a vehicle, it is possible to improve fuel efficiency and also improve linearity of braking and shifting ability by increasing a high-efficiency period of a motor by effectively reducing a shifting time.

In particular, when a synchronization rate is a reference synchronization rate or less, by increasing the rotational speed change rate of the motor by rapidly increasing motor torque and then gradually reducing motor torque with progress of synchronization such that the motor torque returns to the motor torque before the actual shifting process, the time needed for the actual shifting step can be reduced.

Accordingly, it is possible to reduce the shifting time without deteriorating the shifting ability, so it is possible to improve not only fuel efficiency, but also shifting ability by maintaining the high-efficiency period of the motor.

Further, by maintaining the rotational speed change rate of the input shaft at a predetermined level while power-off down-shift is performed, shifting ability can be improved and the actual shifting step can be efficiently performed.

Further, by controlling clutch torque of the engaging-side input shaft with an increase in motor torque after the actual shifting process is finished and by performing feedback correction on clutch torque, depending on whether actual slip is generated, reliability in shifting can be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure, when power-off down-shift is started during regenerative braking in a vehicle, reduces or removes influence of prominence and depression by maintaining a rotational speed change rate of an engaging-side input shaft 260 at the level of a reference rate of change by controlling clutch torque of the engaging-side input shaft 260, and reduces a shifting time by controlling motor torque on the basis of the result of comparing a reference synchronization rate with the current synchronization rate in an actual shifting step (S250), so fuel efficiency is improved and shifting can be smoothly performed.

The control of motor torque uses a value calculated by applying a model of a slip change rate determined in accordance with a slip amount at the early stage of synchronization and a motor 400 can be operated with the improved rotational speed change rate with high reliability by performing feedback correction.

Further, regenerative torque of the motor 400 is corrected to improve linearity of braking of a regenerative braking amount that is changed by shifting after the actual shifting step (S250), and accordingly, it is possible to improve shifting ability by correcting clutch torque and to improve reliability by performing feedback correction.

Figure 1:
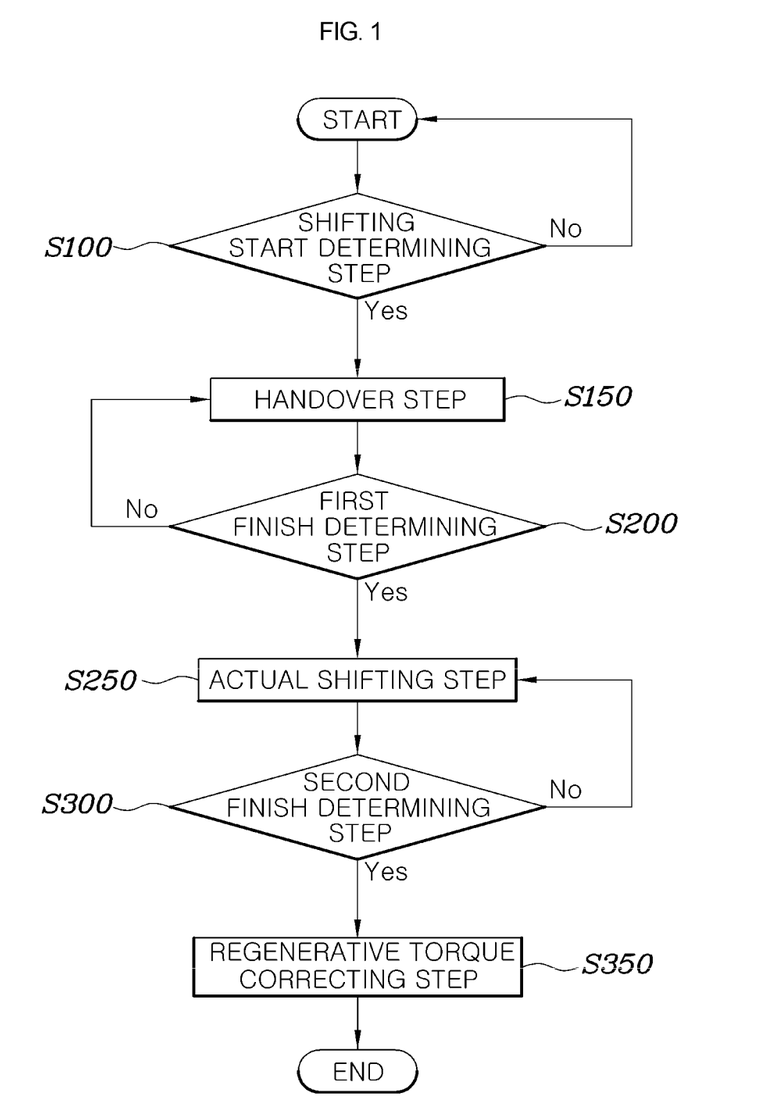
FIG. 1 is a flowchart illustrating a method of controlling a dual clutch transmission for a hybrid electric vehicle according to an embodiment of the present disclosure.
Figure 2:
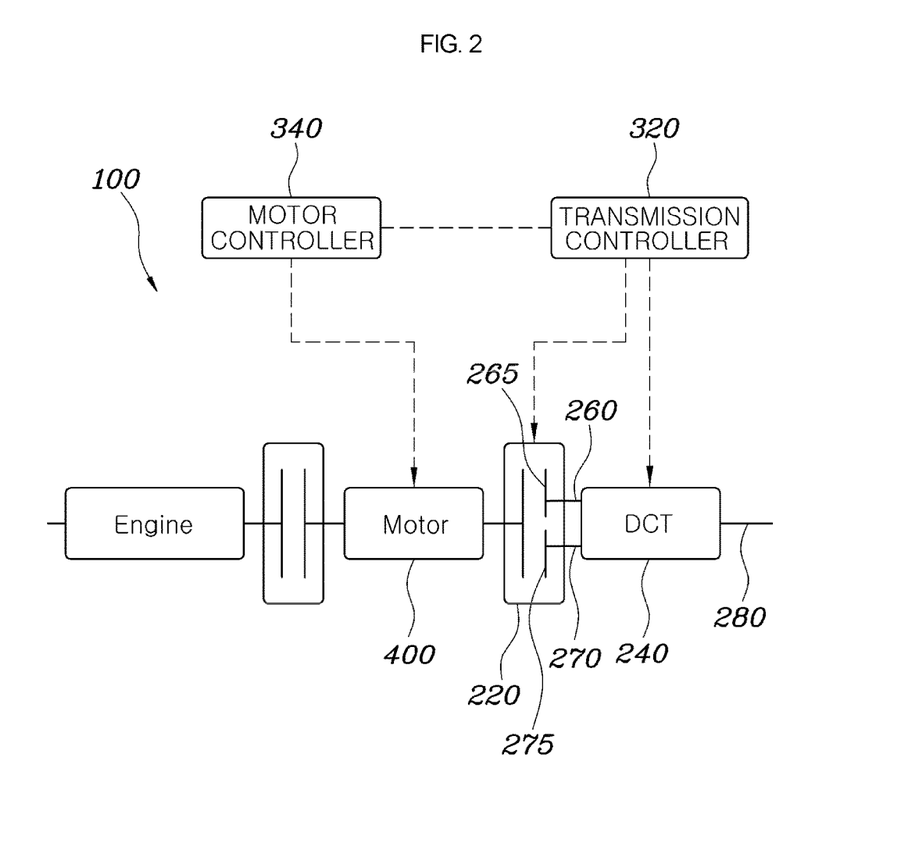
FIG. 2 is a diagram showing a control system of a dual clutch transmission for a hybrid electric vehicle according to an embodiment of the present disclosure.
Figure 3:
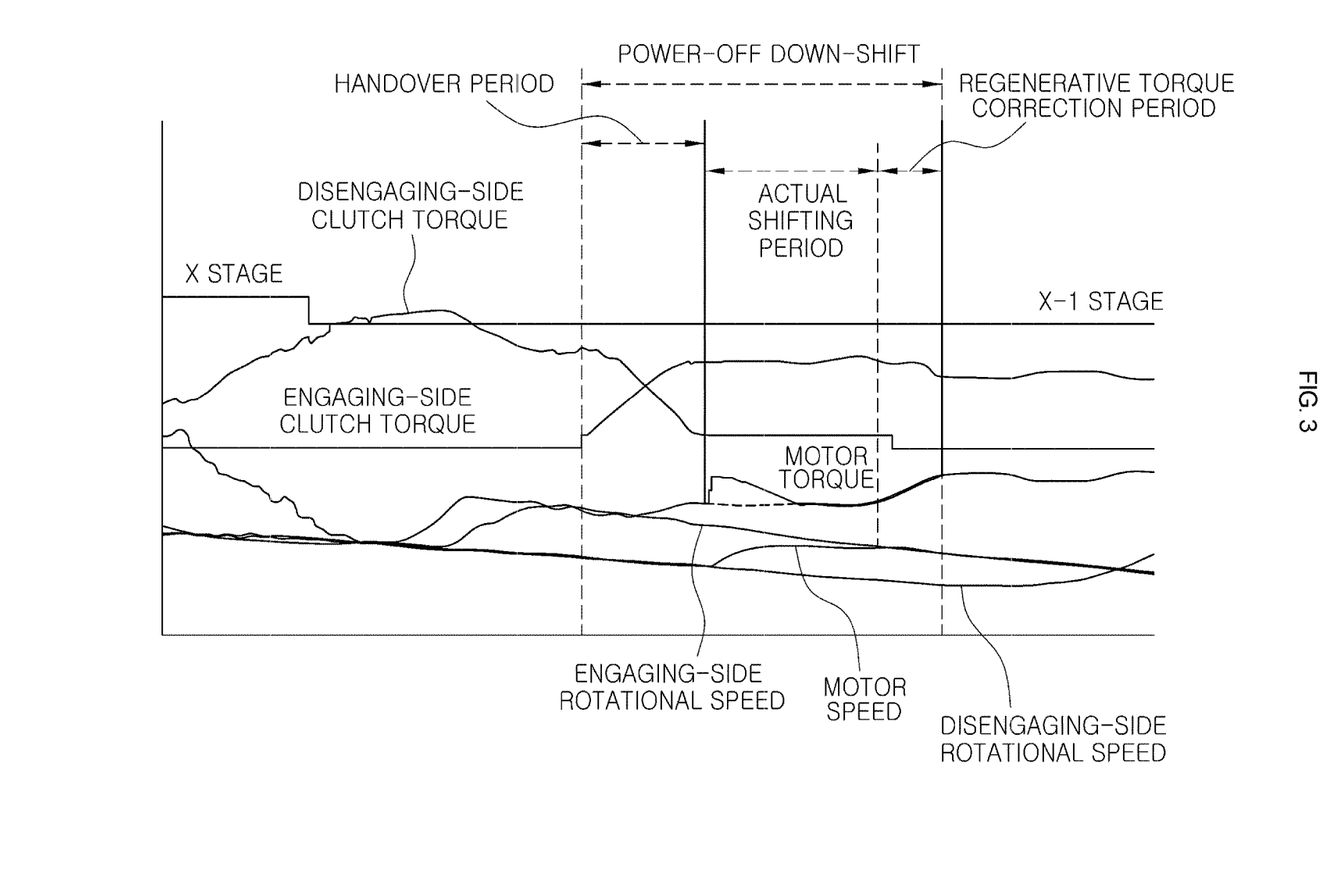
FIG. 3 is a graph illustrating a shifting process by a method of controlling a dual clutch transmission for a hybrid electric vehicle according to an embodiment of the present disclosure.

A control method of a dual clutch transmission for a hybrid electric vehicle, as shown in FIGS. 1 to 3, includes a shifting start determining step that determines, by a transmission controller, whether a vehicle has entered power-off down-shift during regenerative braking (S100); a handover step that performs, by the transmission controller, a handover process of a transmission 240 while controlling clutch torque of an engaging-side input shaft 260 to maintain a rotational speed change rate of the engaging-side input shaft 260 at the level of a reference change rate, when the shifting start determining step (S100) determines that the vehicle has entered the power-off down-shift; a first finish determining step that determines, by the transmission controller, whether the handover process has finished (S200); and an actual shifting step (S250) that synchronizes, by a motor controller, the rotational speed of a motor 400 with the rotational speed of the engaging-side input shaft 260 when the first finish determining step (i.e., S200) determines that the handover process has finished, and that increases, by the motor controller, a rotational speed change rate of the motor 400 by increasing motor torque when a synchronization rate is a reference synchronization rate or less (S250).

In detail, the shifting start determining step (S100) determines whether a vehicle has entered power-off down-shift during regenerative braking. The power-off down-shift means a state in which shifting is performed from the current gear stage to a lower gear stage in a tip-out state in which an accelerator signal is not generated.

In a hybrid electric vehicle, when a brake signal is generated, regenerative braking for producing electric energy by operating the motor 400 backward in response to a pedal effort by a driver can be performed, and when the speed of the vehicle starts to be decreased by the regenerative braking, power-off down-shift is performed, in which a transmission controller 320 determines whether power-off down-shift has been entered.

When the shifting start determining step (S100) determines that the vehicle has entered the power-off down-shift, the handover step (S150) starts a handover process of the transmission 240 while controlling clutch torque of the engaging-side input shaft 260 to maintain the rotational speed change rate of the engaging-side input shaft 260 at the level of the reference change rate.

The handover process in the dual clutch transmission 240 means a shifting process in which clutch torque of the engaging-side input shaft 260 of the transmission increases, while clutch torque of a disengaging-side input shaft 270 decreases. FIG. 3 shows this torque change process.

The clutch torque means torque transmitted to a clutch disc 265 for the engaging-side input shaft 260 or a clutch disc 275 for the disengaging-side input shaft 270.

The clutch torque of the engaging-side input shaft 260 may be calculated from the relationship between motor torque and the inertia force of the motor 400 and the rotational speed change rate of the motor 400 is consequently equal to the rotational speed change rate of the engaging-side input shaft 260, so the rotational speed change rate of the engaging-side input shaft 260 can be controlled on the basis of the motor torque and the clutch torque.

On the other hand, a rotational speed change rate may be irregularly changed by vibration from the ground in the handover process and the actual shifting process while a vehicle is driven, so the control of maintaining the rotational speed change rage of the engaging-side input shaft 260 at a predetermined level is performed in advance in the handover process to inhibit the irregular change. This may be achieved by controlling the clutch torque of the engaging-side input shaft 260.

Accordingly, there is a reference value where the rotational speed change rate of the engaging-side input shaft 260 is maintained, and it is called the reference change rate in this embodiment. The reference change rate can be varied in accordance with shifting conditions, but it may be the rotational speed change rate of the engaging-side input shaft 260 when the handover process is started.

Accordingly, by controlling the clutch torque of the engaging-side input shaft 260 such that the rotational speed change rage of the engaging-side input shaft 260 is maintained at the reference change rate while power-off down-shift is performed, shifting control of the present disclosure can be more accurately performed, so the shifting ability is improved, which results in reduction of a shifting time.

The first finish determining step (S200) determines whether the handover process has finished. In detail, when the handover process finishes during shifting in a hybrid electric vehicle with a dual clutch transmission, the actual shifting process that synchronizes the rotational speed of the motor 400 with the rotational speed of the engaging-side input shaft 260 is performed.

That is, the first finish determining step (S200) determines whether the transmission 240 has entered the actual shifting process, after the handover process finished. The progressive states of the handover process and the actual shifting process can be seen from the graph in FIG. 3.

In the actual shifting step (S250), the rotational speed of the motor 400 is synchronized with the rotational speed of the engaging-side input shaft 260, and when the synchronization rate is the reference synchronization rate or less, the motor torque is increased, thereby increasing the rotational speed change rate of the motor 400.

In detail, the transmission 240 converts the torque at the engaging side and the disengaging side through the handover process, and then increases the rotational speed of the motor 400 to synchronize it with the rotational speed of the engaging-side input shaft 260.

In this process, the faster the synchronization of the rotational speed of the motor 400 with the rotational speed of the engaging-side input shaft 260 in the actual shifting step (S250), the shorter the shifting time, and particularly, the rotational speed change rate of the motor 400 at the early stage of the actual shifting step (S250) substantially influences reduction of the needed time for the actual shifting step (S250).

The rotational speed change rate of the motor 400 has relation to the clutch torque and the rotational speed change rate of the engaging-side input shaft 260, and it is expressed as the following equation 1.

$$Tm=(-1)*Tc\_app+Jm*(d\mathrm{Slip}(Nm-Ni)/dt+dNi/dt))$$

where Tm is motor torque, Tc_app is clutch torque of the engaging-side input shaft 260, dSLIP/dt is a slip change rate of the clutch 220, which is obtained from the difference between the rotational speed change rate of the motor 400 and the rotational speed change rate of the engaging-side input shaft 260, dNi/dt is the rotational speed change rate of the engaging-side input shaft 260, and Jm is inertia moment of the motor 400.

In the equation 1, the rotational speed change rate of the engaging-side input shaft 260 is maintained at the reference change rate from the handover step (S150) through control of clutch torque, and as a result, the rotational speed change rate of the motor 400 or the slip change rate of the clutch 220 can be determined by the motor torque.

Accordingly, in order to rapidly increase the rotational speed change rate of the motor 400 at the early stage of the actual shifting step (S250), the motor torque is rapidly increased when the synchronization rate is the reference synchronization rate or less.

The synchronization rate, which is the ratio of the difference between the current rotational speed of the motor 400 and the rotational speed of the disengaging-side input shaft 270 to the difference between the rotational speed of the engaging-side input shaft 260 and the rotational speed of the motor 400 when synchronization is started, is used as an index showing a completion percentage of synchronization and may have a value within the range of 0% to 100%. When the synchronization is 0%, it means the point of start time of the synchronization, while 100% means the point of end time, but they are different from the concept of time.

The point of start time of synchronization may mean a point of time the same as the point of start time of the actual shifting step (S250), while the reference synchronization rate means the point of end time of control for rapidly increasing motor torque to rapidly increasing the rotational speed change rate of the motor at the early stage of synchronization, and it may be experimentally determined and may be 10%. The values determined in this way may be changed, if necessary.

Accordingly, in order to increase the rotational speed change rate of the motor 400, which has significant influence on reduction of the time needed for the actual shifting step (S250), to the maximum at the early stage of synchronization, motor torque is rapidly increased, as shown in FIG. 3, when the synchronization rate is the reference synchronization or less.

Referring to the graph in FIG. 3 to observe the behavior relationship between motor torque and the rotational speed change rate of the motor 400, it can be seen that when the shifting process enters the actual shifting step (S250), motor torque is rapidly increased with a very large increase rate in a synchronization period under the reference synchronization rate and the rotational speed of the motor 400 shows the largest change rate at the early stage of the actual shifting step (S250).

Accordingly, it is possible to reduce the time taken to synchronize the rotational speeds of the motor 400 and the engaging-side input shaft 260 up 70% or more in comparison to the related art in the actual shifting step (S250), so fuel efficiency and shifting ability can be improved.

On the other hand, as shown in FIGS. 1 to 3, according to the control method of a dual clutch transmission for a hybrid electric vehicle, the larger the slip amount at the point of start time of synchronization in the actual shifting step (250), the larger the increase ratio of the motor torque under the reference synchronization rate.

In detail, the difference in rotational speed between the engaging-side input shaft 260 and the motor can be the slip amount generated by the clutch 220 while synchronization is performed, and as the slip amount at the point of start time of synchronization increases, the rotational speed change rate of the motor 400 required at the same point of time should be increased.

Further, since the increase rate of the motor torque should be increased to increase the rotational speed change rate of the motor 400, the larger the slip amount at the point of start time of synchronization, the larger the increase rate of the motor torque.

The relationship between the slip amount and the increase amount of motor torque can be experimentally and theoretically calculated and determined in advance and FIG. 3 shows an example of the increase rate of motor torque according to a predetermined slip amount.

As illustrated in FIGS. 1 to 3, according to the control method of a dual clutch transmission for a hybrid electric vehicle, when the synchronization rate is the reference synchronization or more in the actual shifting step (S250), as the synchronization progresses, the motor torque reduces and returns to the motor torque before the actual shifting step (S250) is started.

In detail, the rotational speed change rate of the motor 400 is controlled to the maximum level at the early stage of synchronization to reduce the elapse time of the synchronization process in the actual shifting step (S250), and then the rotational speed change rate of the motor 400 should be reduced close to the rotational speed change rate of the engaging-side input shaft 260 for smooth synchronization when the difference between the rotational speeds of the motor 400 and the engaging-side input shaft 260 decreases and the synchronization finishes.

Further, the final rotational speed change rate of the motor 400 at the point of finish time of synchronization can be theoretically or experimentally determined in accordance with the rotational speed change rate of the engaging-side input shaft 260 and the motor torque reduction rate before the synchronization finishes, and the final rotational speed change rate can be determined at various levels, but it may be at a level where at least the motor torque no longer change.

As a result, when the synchronization rate is the reference synchronization rate or less, the motor torque rapidly increases with the increase rate determined on the basis of the slip amount, and when the synchronization rate increases over the reference synchronization rate, the motor torque is gradually decreased with progression of the synchronization and accordingly the rotational speed change rate of the motor 400 is stabilized. FIG. 3 shows this motor torque change process.

That is, when the difference in rotational speed between the motor 400 and the engaging-side input shaft 260 decreases within a predetermined range, the rotational speed change rate of the motor 400 is also controlled close to the rotational speed change rate of the engaging-side input shaft 260, so smooth synchronization is made without shock due to the difference between the rotational speed change rates of the motor 400 and the engaging-side input shaft 260 at the point of finish time of the synchronization and accordingly shifting response and shifting ability can be improved.

Further, the motor torque is continuously calculated on the basis of a predetermined slip change rate model to satisfy the rotational speed change rate that is continuously required with progress of the synchronization in the actual shifting step (S250).

In detail, the motor torque is controlled to control the rotational speed of the motor 400 in the actual shifting step (S250), that is, consequently, the slip change rate of the clutch 220 obtained from the rotational speed change rates of the motor 400 and the engaging-side input shaft 260 is determined in advance and the motor 400 is controlled at the motor torque calculated from the slip change rate.

Accordingly the slip change rate model of the clutch 220 required in the actual shifting step (S250) is experimentally or theoretically determined in advance and the motor 400 is controlled at motor torque continuously calculated by applying the slip change rate model on the basis of the equation 1, thereby, consequently, satisfying a desired slip change rate of the clutch 220 or a desired rotational speed change rate of the motor 400.

As a result, by determining in advance a slip change rate model for easily satisfying a rising curve of a desired rotational speed of the motor 400 under various shifting conditions and by controlling the motor 400 with motor torque calculated from the slip change rate model, it is possible to reduce the time needed for the actual shifting step (S250) and achieve synchronization of the rotational speed of the motor 400, so it is possible to effectively improve shifting response.

Further, the slip change rate model is determined in accordance with the slip amount at the point of start time of synchronization in the actual shifting step (S250).

In detail, the slip change rate model should be determined to satisfy control of the rotational speed of the motor 400 required to reduce the shifting time and improve the shifting ability even under various conditions during synchronization.

In particular, the slip amount of the clutch 220 that means the difference in rotational speed between the motor 400 and the engaging-side input shaft 260 at the point of start time of synchronization is a condition for determining a slip change rate model required in the current synchronization process.

Accordingly, a slip change rate model corresponding to the slip amount at the point of start time of synchronization is determined in advance in the actual shifting step (S250) and motor torque while the actual shifting step (S250) is performed is controlled by introducing the model value into the equation 1.

As a result, by determining a motor torque value for smoothly increasing the rotational speed of the motor 400 in accordance with various shifting conditions on the basis of the slip amount at the point of start time while the actual shifting step (S250) progresses in accordance with the equation 1 and by controlling the motor 400 on the basis of the motor torque value, shifting response can be improved.

On the other hand, according to the control method of a dual clutch transmission for a hybrid electric vehicle of an embodiment of the present disclosure, feedback correction is performed on the motor torque such that the actual slip change rate is equal to the slip change rate model by applying motor torque calculated by the slip change rate model in the actual shifting step (S250).

Even though the motor 400 is controlled at the motor torque calculated on the basis of the slip change rate model that is theoretically or experimentally determined in advance, a desired resultant value may not be achieved by various unexpected factors in actual use.

Accordingly, in order to further improve reliability of the control result of the motor 400 using the slip change rate model, the slip change rate generated when actual motor torque is applied and the predetermined slip change rate model are compared each other, and feedback correction is performed on the motor torque to remove an error.

The feedback correction means a process that compares a resultant value actually obtained from a variable applied to obtain a resultant value required in a control process with a resultant value that has been required before, and then corrects the variable based on the error (i.e., the result of the comparison).

That is, by comparing again the actual slip change rate resulting from controlling the motor 400 at the motor torque calculated on the basis of the slip change rate model with a slip change rate model and then correcting again the motor torque by applying an error calculated from the comparing, the reliability in control of the rotational speed of the motor 400 required in the present disclosure is improved and the transmission efficiency is improved accordingly.

On the other hand, clutch torque of the engaging-side input shaft 260 is controlled to maintain the rotational speed change rate of the engaging-side input shaft 260 at a predetermined level in the actual shifting step (S250).

As described above, the rotational speed change rate of the engaging-side input shaft 260 may be changed by vibration from the ground in the actual shifting step (S250), and it may deteriorate reliability of control in the actual shifting step (S250) by changing the rotational speed where the motor 400 is supposed to be finally synchronized.

Accordingly, as the clutch torque of the engaging-side input shaft 260 is controlled and the rotational speed is maintained, a desired rotational speed where the motor 400 is finally synchronized is calculated with sufficient reliability, so the reliability in control of the present disclosure is effectively increased.

On the other hand, as in FIGS. 1 and 2, the control method of a dual clutch transmission for a hybrid electric vehicle further includes a second finish determining step (S300) that determines whether the actual shifting step (S250) has finished by determining whether the current slip amount after the actual shifting step (S250) is smaller than a reference slip amount.

In detail, the current slip amount shows the difference in current rotational speed between the motor 400 and the engaging-side input shaft 260, and when the slip amount is smaller than the reference slip amount, it is actually the actual shifting step (S250), it is possible to determine that the process of synchronizing the rotational speed of the motor 400 has finished.

The reference slip amount, which is experimentally or theoretically determined in advance, may be determined in accordance with the slip amount at the point of start time of synchronization or the rotational speed change rate of the motor 400, and may be determined in association with the slip change rate model.

Further, as shown in FIGS. 1 to 3, the control method of a dual clutch transmission for a hybrid electric vehicle further includes a regenerative torque correcting step (S350) that corrects regenerative torque of the motor 400 into desired regenerative torque after shifting is finished, when the second finish determining step (S300) determines that the current slip amount is smaller than the reference slip amount.

In detail, when a hybrid electric vehicle enters power-off down-shift during regenerative braking, the gear ratio changes before and after shifting and thus torque transmitted to the output shaft 280 also changes, and similarly, regenerative braking force of the output shaft 280 may change with completion of down-shift even though the regenerative torque of the motor 400 is maintained.

In the present disclosure, the regenerative torque means torque consumed by the motor 400 for regenerative braking and the regenerative braking force means braking force generated by the output shaft 280 of the transmission 240 due to the regenerative torque.

That is, when a vehicle enters down-shift during regenerative braking even though the regenerative torque of the motor 400 is maintained, the regenerative braking force of the output shaft 280 changes and may cause a problem with the linearity of braking of the vehicle, and accordingly, a change in regenerative braking force after shifting is determined in consideration of the gear ratio and motor torque is controlled to maintain the regenerative braking force at the level before shifting.

The motor torque is indirectly controlled by adjusting the regenerative torque of the motor 400. FIG. 3 shows this motor torque change.

As a result, when a vehicle enters down-shift during regenerative braking, the regenerative braking force transmitted to the output shaft 280 increases, so the linearity of braking can be maintained by reducing regenerative torque in accordance with a gear ratio.

On the other hand, clutch torque of the engaging-side input shaft 260 is corrected with the sum of remaining torque and motor torque changed by correcting regenerative torque in the regenerative torque correcting step (S350).

As described above, when a vehicle enters power-off down-shift, the regenerative braking force of the output shaft 280 may increase and motor torque may also increase to reduce regenerative torque to correct the increase of the regenerative braking force.

The regenerative torque consumed by the motor 400 consequently decreases, so the clutch torque of the engaging-side input shaft 260 is also required to be reduced, in which the clutch torque is calculated by summing the motor torque and the remaining torque to receive the torque change of the motor 400 with high reliability.

The remaining torque may be determined as a predetermined ratio of the current motor torque or as a predetermined value, and the remaining torque may be 10% of the current motor torque; however, this determining way or determined value may be changed, if necessary.

Accordingly, when the actual shifting process for finishing power-off down-shift has finished and the motor torque has been increased, the clutch 265 of the engaging-side input shaft 260 is controlled at predetermined clutch torque to inhibit slip and achieve torque transmission with the motor 400. In this process, the clutch 220 is controlled at clutch torque considering the remaining torque, so it is advantageous in improvement of shifting ability.

Further, feedback correction is performed on the clutch torque such that a slip amount generated when the corrected clutch torque is applied does not exceed an allowable level in the regenerative torque correcting step (S350).

As described above, when the regenerative torque correcting step (S350) is entered, clutch torque is controlled to correspond to a change in motor torque in consideration of remaining torque, and even in this case, the clutch 220 may slip due to various unexpected factors in actual use.

Accordingly, in order to further improve reliability in the result of controlling clutch torque in consideration of the remaining torque, feedback correction is performed on the clutch torque to remove an error after determining the slip amount generated in actual control of clutch torque exceeds the allowable level.

That is, by checking whether the actual slip amount generated in the result of controlling clutch torque exceeds the allowable level and by correcting again the clutch torque when an error over an allowable level is generated, reliability in the control of clutch torque is improved and shifting ability is improved accordingly.

Further, as illustrated in FIGS. 1 and 2, the transmission controller 320 determines that the vehicle has entered down-shift, performs the handover process of the transmission 240 while controlling the clutch torque of the engaging-side input shaft 260 such that the rotational speed change rate of the engaging-side input shaft 260 is maintained at the reference change rate, and determines whether the handover process has finished; and the motor controller 340 controls the motor 400 such that the rotational speed of the motor 400 is synchronized with the rotational speed of the engaging-side input shaft 260 in cooperation with the transmission controller 320, and increases the rotational speed change rate of the motor 400 by increasing motor torque when the synchronization rate is the reference synchronization rate or less.

In detail, the transmission controller 320 is connected with the transmission 240 and the input shafts 260 and 270, so it collects information from these parts and determines a shifting situation on the basis of the information. Accordingly, it is possible to determine that the vehicle has entered down-shift in accordance with driving information of the vehicle and whether regenerative braking is performed.

On the other hand, the transmission controller 320 performs the handover process of the transmission 240 while controlling the clutch torque of the engaging-side input shaft 260 such that the rotational speed change rate of the engaging-side input shaft 260 is maintained at the reference change rate, and can determine whether the handover process has finished by checking the clutch torque.

Further, the motor controller 340 may be connected to the motor 400 and a hybrid controller and controls the motor 400 such that the rotational speed of the motor 400 is synchronized with the rotational speed of the engaging-side input shaft 260 in response to a signal from the transmission controller 320 through the hybrid controller.

When the synchronization rate is the reference synchronization or less, the motor 400 is controlled such that the rotational speed change rate of the motor 400 is increased by increasing motor torque.

On the other hand, as illustrated in FIG. 2, a control system 100 for a dual clutch transmission for a hybrid electric vehicle according to an embodiment of the present disclosure includes: a motor 400 that is a power source for a vehicle; a transmission 240 that includes an engaging-side input shaft 260 and a disengaging-side input shaft 270 both having clutches 265 and 275, respectively; a transmission controller 320 that determines whether the vehicle has entered down-shift and performs a handover process of the transmission 240 while controlling clutch torque of the engaging-side input shaft 260 such that a rotational speed change rate of the engaging-side input shaft 260 is maintained at a reference change rate; and a motor controller 340 that controls the motor 400 such that the rotational speed of the motor 400 is synchronized with the rotational speed of the engaging-side input shaft 260 in cooperation with the transmission controller 320, and increases the rotational speed change rate of the motor 400 by increasing motor torque when a synchronization rate is a reference synchronization rate or less.

In detail, the motor 400 is provided as a power source of a vehicle and drives a vehicle by transmitting torque from the transmission 240 to an output shaft 280. When the transmission controller 320 determines whether the vehicle has entered down-shift and collects and transmits various items of information about the transmission 240 to the motor controller 340, the motor controller 340 performs necessary control, so shifting time can be reduced and fuel efficiency and shifting ability can be improved.

Although exemplary embodiments of the present disclosure have been described for illustrative purposes, those skilled in the art will appreciate that various modifications, additions and substitutions are possible, without departing from the scope and spirit of the present disclosure.

What is claimed is:

1. A control method of a dual clutch transmission for a hybrid electric vehicle, the method comprising:
   a shifting start determining step of determining, by a transmission controller, whether the vehicle has entered power-off down-shift during regenerative braking;
   a handover step of performing, by the transmission controller, a handover process of the transmission while controlling clutch torque of an engaging-side input shaft to maintain a rotational speed change rate of the engaging-side input shaft at a reference change rate, when the shifting start determining step determines that the vehicle has entered the power-off down-shift;
   a first finish determining step of determining, by the transmission controller, whether the handover process has finished; and
   an actual shifting step of synchronizing, by a motor controller, a rotational speed of a motor with a rotational speed of the engaging-side input shaft when the first finish determining step determines that the handover process has finished, and the actual shifting step of increasing, by the motor controller, a rotational speed change rate of the motor by increasing motor torque when a synchronization rate is a reference synchronization rate or less.

2. The method of claim 1, wherein when a slip amount between the engaging-side input shaft and the motor at a point of start time of synchronization in the actual shifting step increases, an increase rate of the motor torque under the reference synchronization rate increases.

3. The method of claim 2, wherein when the synchronization rate is the reference synchronization rate or more in the actual shifting step, the motor torque reduces and returns to a motor torque before the actual shifting step, as the synchronization progresses.

4. The method of claim 3, wherein the motor torque is continuously calculated according to a predetermined slip change rate model to satisfy the rotational speed change rate of the motor that is continuously required with progress of the synchronization in the actual shifting step.

5. The method of claim 4, wherein the predetermined slip change rate model is determined in accordance with the slip amount at the point of start time of the synchronization in the actual shifting step.

6. The method of claim 4, wherein feedback correction is performed on the motor torque such that an actual slip change rate is equal to the predetermined slip change rate model by applying motor torque calculated by the slip change rate model in the actual shifting step.

7. The method of claim 1, wherein the clutch torque of the engaging-side input shaft is controlled such that the rotational speed change rate of the engaging-side input shaft is maintained at the reference change rate in the actual shifting step.

8. The method of claim 1, further comprising a second finish determining step of checking whether the actual shifting step has finished by checking whether a current slip amount is smaller than a reference slip amount after the actual shifting step.

9. The method of claim 8, further comprising a regenerative torque correcting step of correcting a regenerative torque of the motor into a desired regenerative torque after shifting is finished, when the second finish determining step determines that the current slip amount is smaller than the reference slip amount.

10. The method of claim 9, wherein the clutch torque of the engaging-side input shaft is corrected with a sum of remaining torque and motor torque changed by correcting the regenerative torque in the regenerative torque correcting step.

11. The method of claim 9, wherein feedback correction is performed on the clutch torque such that a slip amount generated when a corrected clutch torque is applied does not exceed an allowable level in the regenerative torque correcting step.

12. A control system for a dual clutch transmission for a hybrid electric vehicle, comprising:
a motor being a power source for the vehicle;
the transmission including an engaging-side input shaft and a disengaging-side input shaft that each include a clutch;
a transmission controller configured to determine whether the vehicle has entered a down-shift and configured to perform a handover process of the transmission while controlling a clutch torque of the engaging-side input shaft such that a rotational speed change rate of the engaging-side input shaft is maintained at a reference change rate; and
a motor controller configured to control the motor such that a rotational speed of the motor is synchronized with a rotational speed of the engaging-side input shaft in cooperation with the transmission controller, and the motor controller configured to increase a rotational speed change rate of the motor by increasing motor torque when a synchronization rate is a reference synchronization rate or less.

* * * * *